United States Patent
Matsumoto et al.

(10) Patent No.: US 8,141,607 B2
(45) Date of Patent: Mar. 27, 2012

(54) OPTICAL COMPONENT LENS ASSEMBLING APPARATUS

(75) Inventors: Mitsuji Matsumoto, Kawasaki (JP); Yoshinori Hino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1177 days.

(21) Appl. No.: 11/431,619

(22) Filed: May 11, 2006

(65) Prior Publication Data
US 2007/0175563 A1 Aug. 2, 2007

(30) Foreign Application Priority Data
Feb. 2, 2006 (JP) ................................. 2006-025652

(51) Int. Cl.
*B32B 37/12* (2006.01)
(52) U.S. Cl. ........................................ 156/379.6; 385/14
(58) Field of Classification Search .................... 385/14; 425/184; 269/40, 287, 288, 909, 902; 156/379, 156/379.6
See application file for complete search history.

(56) References Cited

U.S. PATENT DOCUMENTS

| | | | |
|---|---|---|---|
| 3,261,131 A * | 7/1966 | Loh et al. ....................... | 451/335 |
| 3,864,018 A * | 2/1975 | Miller ............................ | 385/98 |
| 5,926,594 A * | 7/1999 | Song et al. ..................... | 385/49 |
| 6,823,109 B2 * | 11/2004 | Sasaki et al. ................... | 385/34 |
| 2004/0105611 A1 * | 6/2004 | Bischel et al. ................. | 385/14 |
| 2005/0156342 A1 * | 7/2005 | Harper et al. ................. | 264/40.1 |
| 2008/0044135 A1 * | 2/2008 | Furuichi et al. ................ | 385/34 |

FOREIGN PATENT DOCUMENTS

| | | |
|---|---|---|
| JP | 11-109176 | 4/1999 |
| JP | 11-295561 | * 10/1999 |
| JP | 2001-242339 | 9/2001 |

OTHER PUBLICATIONS

"Japanese Office Action", mailed by JPO and corresponding to Japanese application No. 2006-025652 on Mar. 30, 2010, with English translation.

* cited by examiner

*Primary Examiner* — Khanh P Nguyen
*Assistant Examiner* — Vishal I Patel
(74) *Attorney, Agent, or Firm* — Fujitsu Patent Center

(57) ABSTRACT

An object is to provide an optical component lens assembling apparatus which is capable of automating the assembly of an optical component having a minute lens and an optical fiber. This apparatus includes: a fiber block fixing device 20 that fixes in position a fiber block 13 on which an optical fiber 11 is provided; a lens grasping device 21 for grasping the outer peripheral side surface of a lens 12 supplied to a lens supply position; an adhesive applying device 22; a lens moving device 23 for placing the one end surface of the lens 12, to which the adhesive has been applied, at a predetermined position of the fiber block 13; and an optical axis alignment state detecting device 24 for detecting the optical axis alignment state of the optical fiber 11 and the lens 12.

6 Claims, 14 Drawing Sheets

OPTICAL COMPONENT LENS ASSEMBLING APPARATUS

BACKGROUND OF THE INVENTION

1. Field of the Invention

The present invention relates to an optical component manufacturing apparatus and method, and an optical component lens assembling apparatus, and, more specifically, to an optical component manufacturing apparatus and method, and an optical component lens assembling apparatus suitable for assembling a lens in an optical component having a minute lens and an optical fiber.

2. Description of the Related Technology

The respective elements of an optical component having a lens and an optical fiber for use in an optical communications apparatus are required to be assembled with high precision. In particular, a very high level of assembly precision is required of an optical component having a minute lens and an optical fiber.

Conventionally, the assembly of a lens in an optical component with a minute lens of a diameter of approximately 1.5 mm assembled to an optical fiber with a diameter of, for example, approximately 80 μm, with its optical axis aligned with that of this optical fiber, is generally conducted by manual operation.

[Patent Document 1] JP 11-295561 A
[Patent Document 2] JP 2001-242339 A

However, when assembling a lens in an optical component with a minute lens and an optical fiber by manual operation as in the prior art, there is a problem in that the operational efficiency is very low.

In particular, when the optical component is one in which a plurality of minute lenses and optical fibers are arranged in parallel at small intervals, the operational efficiency in assembly is further deteriorated.

This problem is not restricted to a case in which a lens and an optical fiber are assembled together; it also occurs when manufacturing an optical component by assembling a first optical member and a second optical member.

SUMMARY OF THE INVENTION

The present invention has been made in view of the above problem. It is an object of the present invention to provide an apparatus for and a method of manufacturing an optical component, and an optical component lens assembling apparatus which makes it possible to automate the assembly of a lens in an optical component having a first optical member such as a minute lens and a second optical member such as an optical fiber, thereby achieving a substantial improvement in operational efficiency in assembly work.

In order to achieve the above object, the present invention adopts the following devices.

(1) An apparatus for manufacturing an optical component by combining a first optical member and a second optical member with each other, comprising:

a fixing device fixing the first optical member in position;
a grasping device grasping the second optical member;
an adhesive supply device supplying an adhesive to be applied to at least one of the first optical member and the second optical member;
a driving device driving the grasping portion so as to cause the second optical member to move toward the first optical member after the application of the adhesive; and
a detecting device detecting the state of the optical axes of the first optical member and the second optical member when the first optical member and the second optical member are combined with each other.

(2) Further, a method of manufacturing an optical component according to the present invention, relates to a method of manufacturing an optical component by using a first optical member and a second optical member includes the steps of:

grasping the first optical member by a first grasping device;
grasping the second optical member by a second grasping device that can be driven;
driving the second grasping device to move the second optical member, to an adhesive supply device to apply an adhesive to the second optical member;
driving the second grasping device to move the second optical member, to which the adhesive has been applied, to a position of the first optical member;
placing the second optical member on the first optical member;
detecting the state of the optical axes of the first optical member and the second optical member;
aligning the optical axes of the first optical member and the second optical member with each other according to a result of detection of the state of the optical axes;
hardening the adhesive applied to the second optical member, whose optical axis has been aligned; and
releasing the second optical member and causing the second grasping portion to retreat.

(3) Further, an optical component lens assembling apparatus for according to the present invention, relates to an apparatus for assembling a lens of an optical component having at least one optical fiber, a fiber block for fixing the optical fiber in position, and a cylindrical lens to be fixed to the fiber block with its optical axis aligned with that of the optical fiber, wherein the cylindrical lens is fixed, the apparatus comprising:

a fiber block device fixing in position the fiber block on which the optical fiber is provided;
a lens grasping device grasping an outer peripheral side surface of the cylindrical lens supplied to a lens supply position;
an adhesive applying device applying an adhesive to one end surface of the cylindrical lens;
a lens moving device placing one end surface of the cylindrical lens, to which the adhesive has been applied, at a predetermined position of the fiber block; and
an optical axes alignment state detecting device detecting the optical axes alignment state of the optical fiber and the cylindrical lens.

According to the present invention, it is possible to automatically perform the operation of connecting a cylindrical lens to a fiber block to which at least one optical fiber is fixed. In particular, the operational efficiency of a lens assembly operation for an optical component with a minute lens, which is hard to handle manually, and an optical fiber, can be substantially improved as compared to the case in which it is conducted through manual operation.

(4) In the optical component cylindrical lens assembling apparatus, it is desirable that the cylindrical lens grasping device have a V-shaped groove supporting a portion of the outer peripheral side surface of the cylindrical lens, and a pressing device for pressing the outer peripheral side surface of the lens toward the V-shaped groove.

In this case, it is possible to grasp the outer peripheral side surface of the cylindrical lens, so that it is possible to prevent generation of a flaw on the light input surface or the light output of the cylindrical lens surface when grasping the cylindrical lens.

(5) As the pressing device, there is exemplified a wire which is wrapped around a portion on the side opposite to the portion of the outer peripheral side surface of the cylindrical lens supported by the V-shaped groove, and is pulled to the V-shaped groove side. In this case, the construction of the pressing device can be simplified.

(6) In the optical component lens assembling apparatus, it is desirable for the adhesive to be a photo-setting one. In this case, it is possible to adjust the curing time of the adhesive, so that the operational timing for each portion can be set arbitrarily without being restricted to the curing time of the adhesive.

(7) As the optical axis alignment state detecting device, there are exemplified an optical axis position measuring device measuring an optical axis and positional coordinates of a light transmitted through the optical fiber and the cylindrical lens, and an optical power meter for measuring the output of the light transmitted through the optical fiber and the cylindrical lens.

In this case, the detection of the alignment state of the optical axes of the cylindrical lens and the optical fiber is effected by the optical axis position measuring device and the optical power meter, so it is possible to detect the optical axis alignment state more accurately.

(8) The optical component lens assembling apparatus further includes a reflection mirror for causing a reflected light obtained through reflection of the light transmitted through the optical fiber and the cylindrical lens, to enter the cylindrical lens again, in which the optical power meter is configured to measure the output of the light after transmission of the reflected light through the cylindrical lens and the optical fiber.

(9) In the optical component lens assembling apparatus, it is desirable to have the cylindrical lens grasping state detecting device for detecting the state in which the cylindrical lens is grasped by the cylindrical lens grasping device.

(10) As the optical component, there is exemplified one in which a plurality of the optical fibers and the cylindrical lenses are arranged in parallel. It is possible to assemble a cylindrical lens in such an optical component by the optical component cylindrical lens assembling apparatus of the present invention.

As a result of a reduction in optical component size, the cylindrical lens interval is very small, so that, when performing cylindrical lens assembling by manual operation, not only does the efficiency in assembly operation deteriorates, but the cylindrical lens assembly itself is difficult to perform. The optical component lens assembling apparatus of the present invention makes it possible to reliably assemble the cylindrical lens of such a minute optical component.

In accordance with the present invention, it is possible to automatically assemble a second optical member (cylindrical lens) in an optical component having a first optical member such as a minute cylindrical lens and a second optical member such as an optical fiber, so that it is possible to achieve a substantial improvement in terms of efficiency in assembly operation.

DETAILED DESCRIPTION OF THE INVENTION

In the following, an apparatus for and a method of manufacturing an optical component and an optical component lens assembling apparatus according to the present invention will be described in detail with reference to the drawings.

Figure 1:
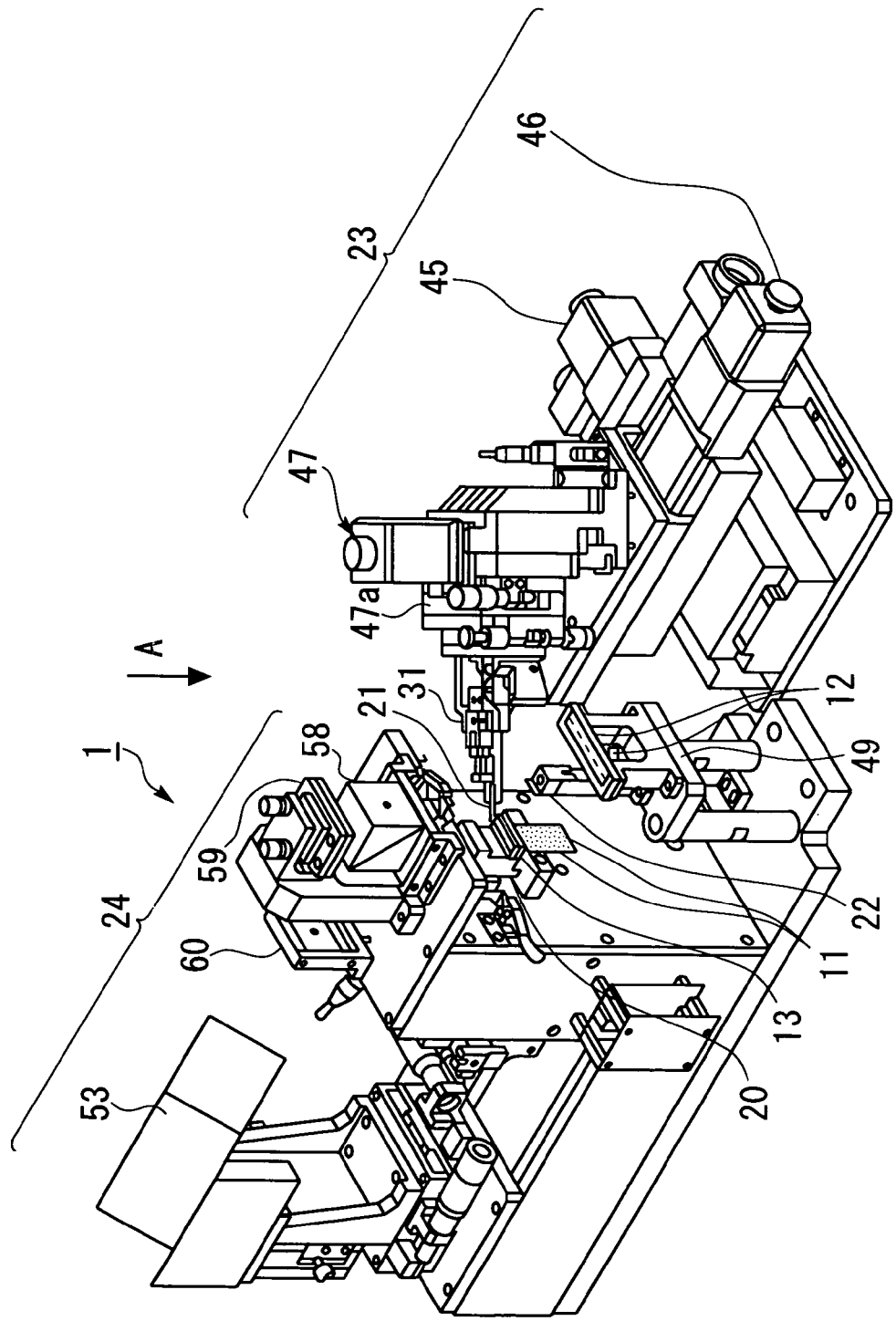
FIG. 1 is a perspective view of an optical component lens assembling apparatus according to the present invention.
Figure 2:
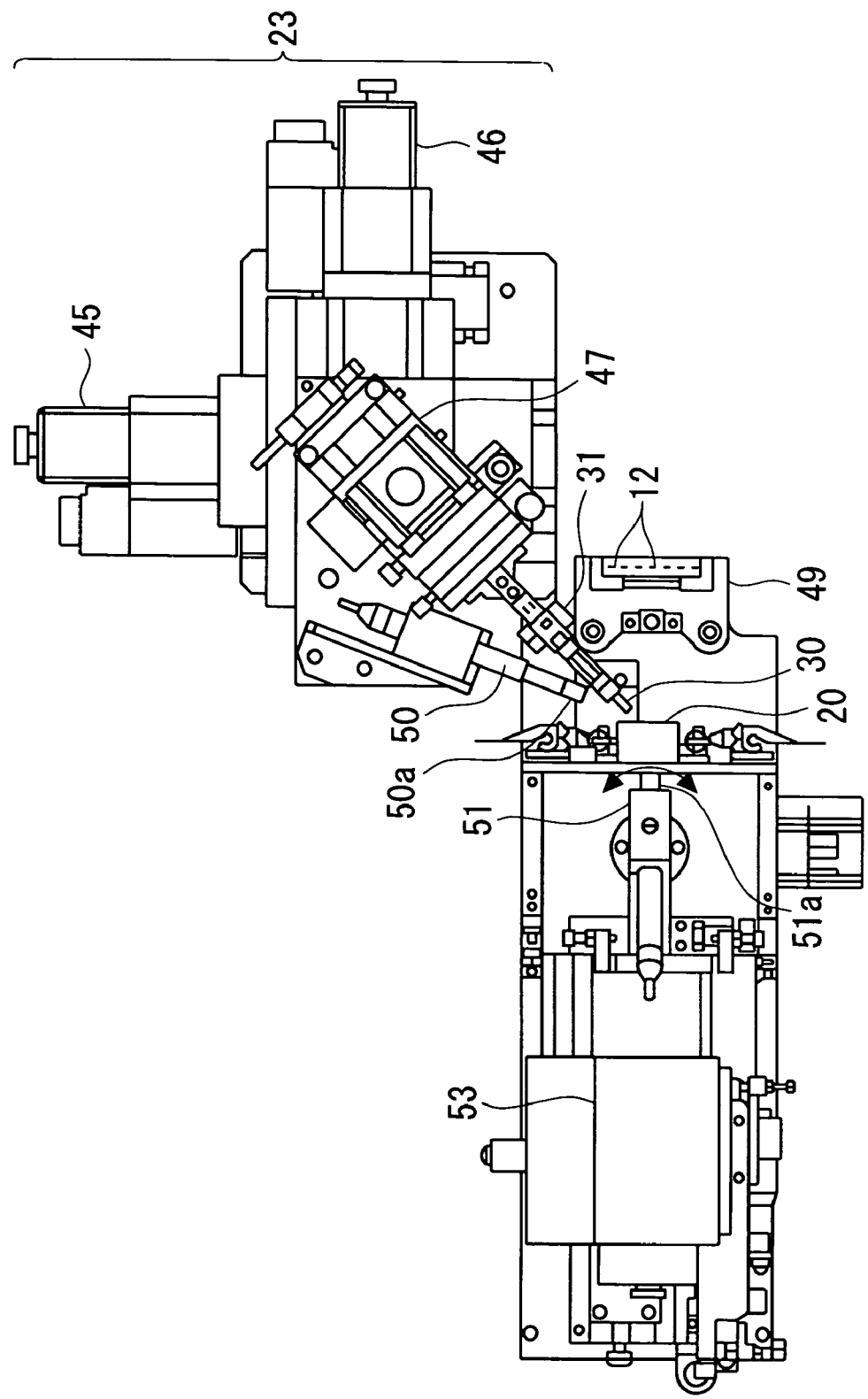
FIG. 2 is a plan view, taken in the direction of arrow A of FIG. 1, of the optical component lens assembling apparatus of the present invention.
Figure 3:
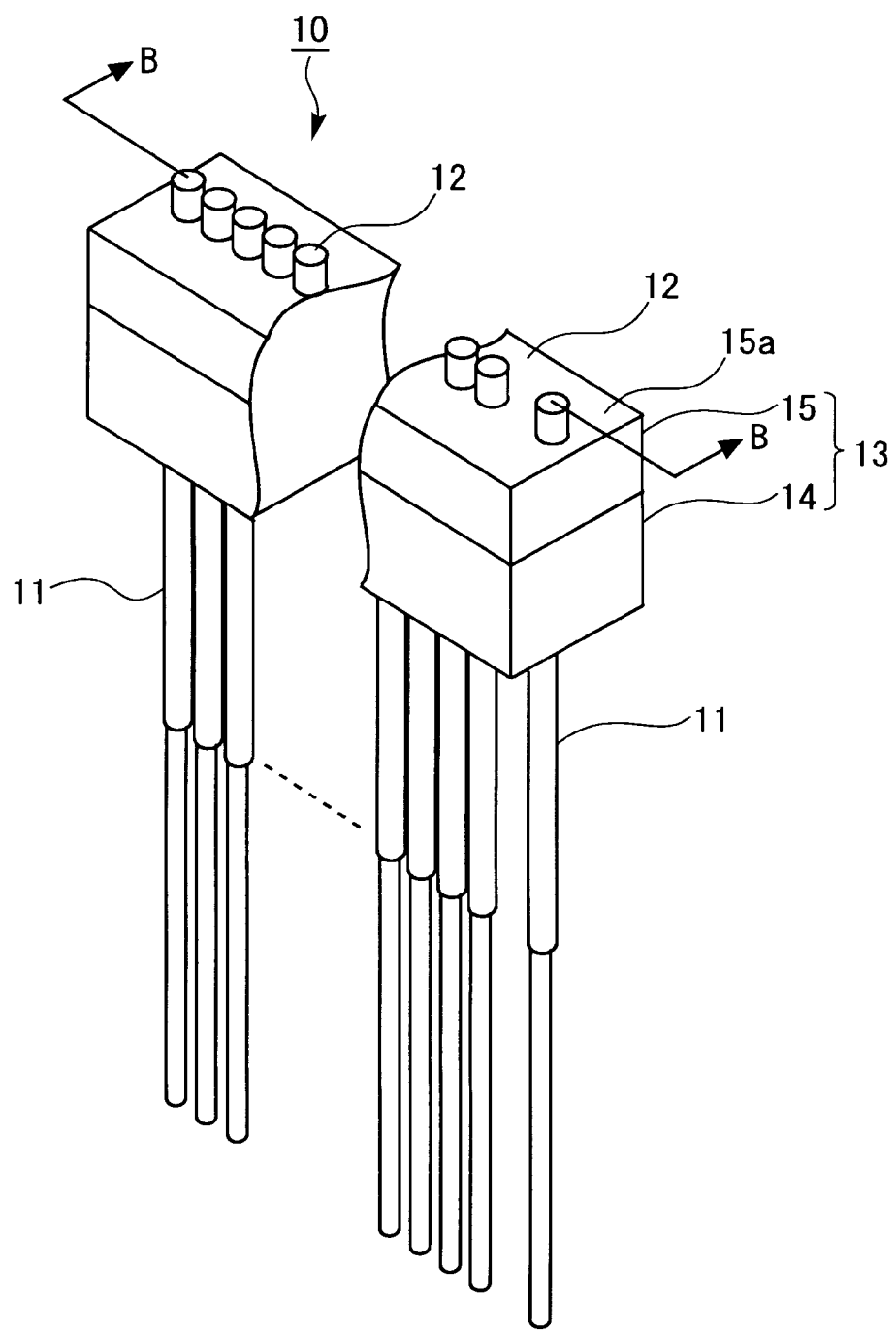
FIG. 3 is a perspective view of an optical component according to the present invention.

FIGS. 1 and 2 show an optical component lens assembling apparatus 1 to which the apparatus for and the method of manufacturing an optical component of the present invention are applied. The lens assembling apparatus 1 of this optical component is used to assemble lenses 12 of an optical component 10 which, as shown in FIG. 3, has optical fibers 11 inserted in parallel into a fiber block 13 and constituting the second optical members, and cylindrical lenses 12 constituting the first optical members.

In this embodiment, the diameter of the optical fibers 11 is approximately 80 μm, the diameter of the lenses 12 is approximately 1.5 mm, and the intervals between the lenses 12 is approximately 0.4 mm. The optical component lens assembling apparatus 1 of the present invention is capable of assembling such the minute lenses 12, which are difficult to handle manually, at very small intervals.

The fiber block 13 has a ceramic first block 14 and a second block 15 formed of transparent glass. The first block 14 and the second block 15 are formed as parallelepipeds.

Figure 4:
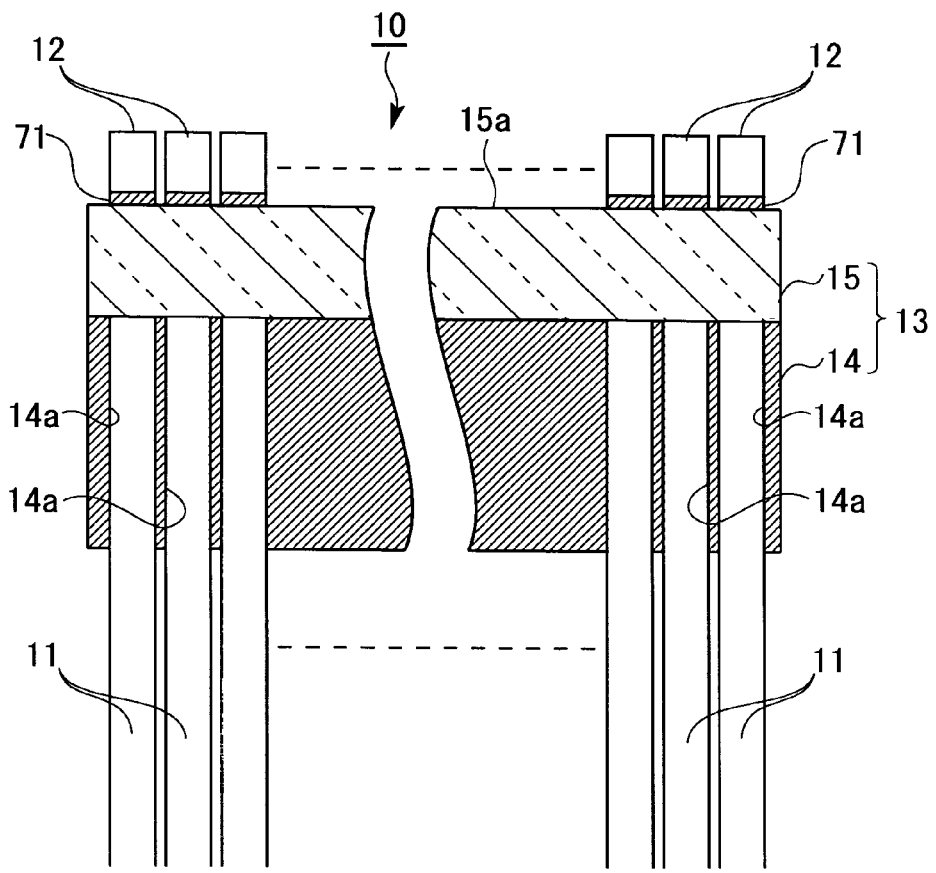
FIG. 4 is a sectional view, taken along the line B-B of FIG. 3, of the optical component of the present invention.

As shown in FIG. 4, the first block 14 is provided with a plurality of through-holes 14a. The through-holes 14a are provided at predetermined intervals so as to be parallel to each other. The optical fibers 11 are inserted into the through-holes 14a and fixed thereto.

A second block 15 is provided with no holes. The optical fibers 11 are inserted into the through-holes 14a of the first block 14 until they abut the second block 15.

Light output from the optical fibers 11 is transmitted through the second block 15 before being input to the lenses 12. In this embodiment, the refractive index of the second block 15 is substantially the same as the refractive index of the optical fibers 11.

The optical axes of the lenses 12 are aligned with the optical axes of the optical fibers 11 fixed to the first block 14. The lenses 12 are fixed to the surface 15a of the second block 15 by mean of a UV (ultraviolet) hardening adhesive 71.

In this embodiment, cylindrical collimator lenses are used as the lenses 12. The light output from the optical fibers 11 is diffused by the second block 15, and converted to parallel rays by the collimator lenses 12.

Next, the optical component lens assembling apparatus 1 will be described with reference to FIGS. 1 and 2. The optical component lens assembling apparatus 1 is used to assemble the lenses 12 to the fiber block 13 of the optical component 10.

The fiber block 13 is supplied to the optical component lens assembling apparatus 1 with all the optical fibers 11 fixed thereto beforehand.

Figure 5:
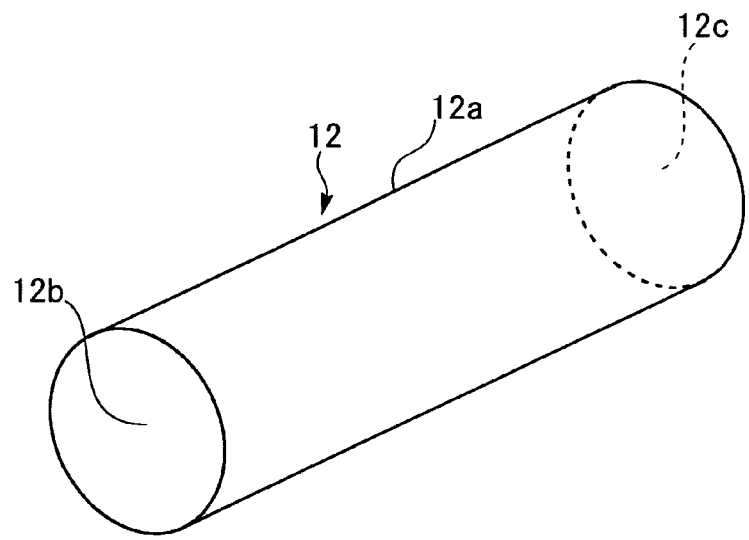
FIG. 5 is a perspective view of a lens of the optical component of the present invention.

As shown in FIG. 1, the optical component lens assembling apparatus 1 is equipped with a fiber block fixing devices (fixing portion) 20 for fixing in position the fiber block 13 with the plurality of optical fibers 11 fixed thereto, and a lens grasping devices (grasping portion) 21 for grasping the outer peripheral side surfaces 12a (see FIG. 5) of the lenses 12 supplied to a lens supply position.

Further, the optical component lens assembling apparatus 1 is equipped with an adhesive applying devices (adhesive supply portion) 22 for applying an adhesive 71 to an adhesive application surface 12b constituting one end surface of each lens 12, a lens moving devices (driving devices) 23 for placing the adhesive application surface 12b of the respective lenses 12 at a predetermined position on the fiber block 13, and an optical axis alignment state detecting devices (detecting portion) 24 for detecting the alignment state of the optical axes of the lenses 12 and the optical axes of the optical fibers 11.

Further, the optical component lens assembling apparatus 1 is equipped with a lens supply stand 49 for supplying the lenses 12 to a lens supply position, and a lens grasping state detecting devices 31 for detecting how each lens is grasped by the lens grasping devices 21.

Further, as shown in FIG. 2, to made to harden the adhesive 71 applied to the lenses 12, the optical component lens assembling apparatus 1 is equipped with first and second UV light irradiation units 50 and 51 for irradiating the adhesive 71 with UV light.

In FIGS. 1 and 2, numeral 53 indicates an optical axis position detecting device described below, numeral 58 indicates a beam splitter, numeral 59 indicates a reflection mirror, and numeral 60 indicates a condensing lens. In order that FIG. 1 may not be too complicated, the first and second UV light irradiation units 50 and 51 are not shown in FIG. 1.

Next, the respective components of the optical component lens assembling apparatus 1 will be described. The fiber block fixing devices 20 is configured to detachably fix the fiber block 13 by a fastening jig or the like using a screw. In this process, the fiber block 13 is fixed in position, with the surface 15a of the second block (see FIG. 4) to which the lenses 12 are to be fixed being on the upper side and horizontal.

Figure 6:
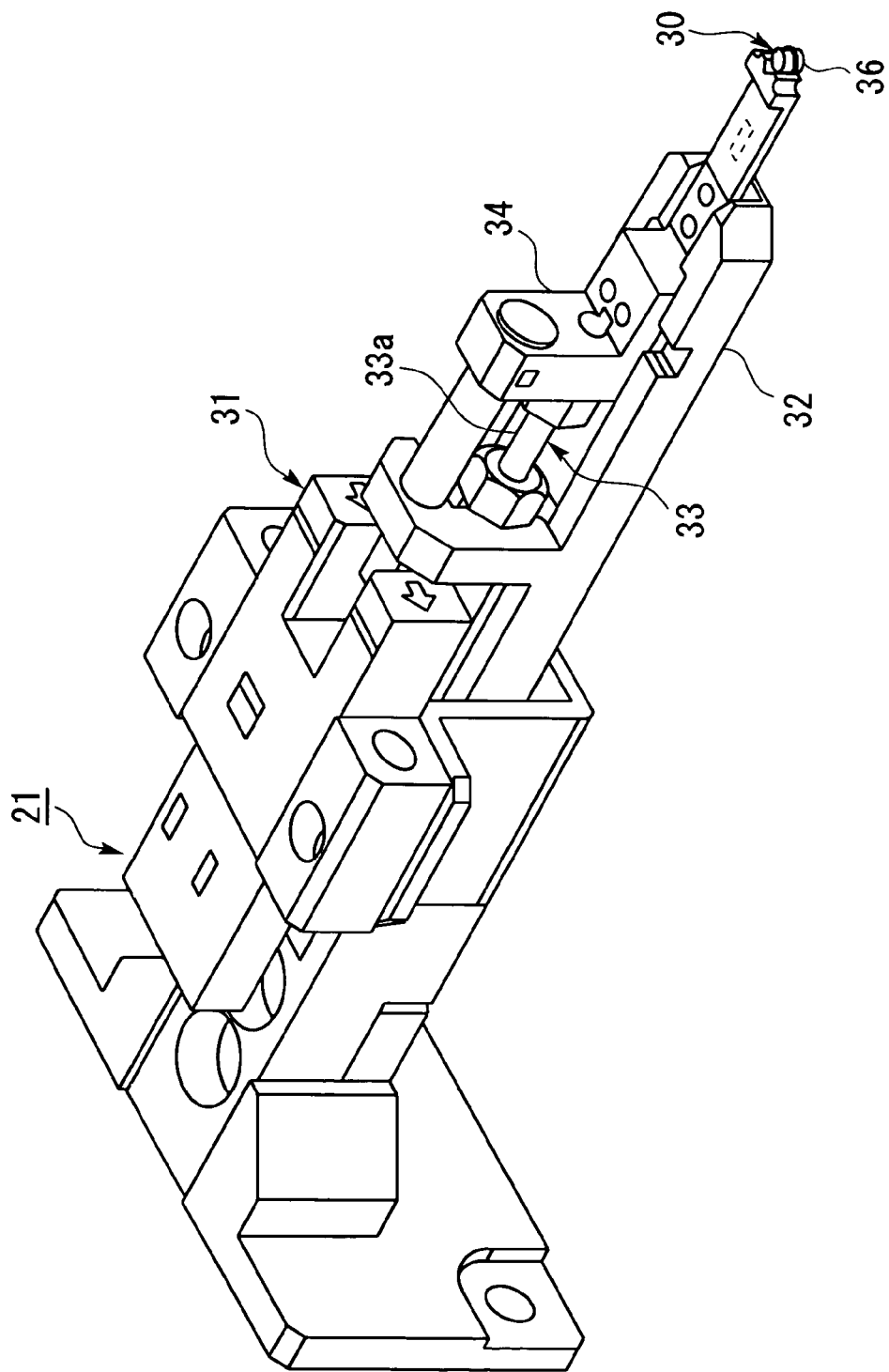
FIG. 6 is a perspective view of the lens grasping device of the optical component lens assembling apparatus of the present invention.

As shown in FIG. 6, the lens grasping devices 21 has a lens grasping portion 30 for grasping the lens 12, and a lens grasping state detecting devices 31 for detecting that the lens 12 is grasped by the lens grasping portion 30.

In FIG. 6, numeral 32 indicates a base member for holding each portion, numeral 33 indicates a direct-acting cylinder fixed to the base member 32, and numeral 34 indicates a wire supporting member for supporting a wire 36 (see FIG. 7) described below. The wire supporting member 34 is fixed to a rod 33a of the direct-acting cylinder 33. As the rod 33a makes in-and-out movement, the wire supporting member 34 slides. As a result, the wire 36 is caused to make in-and-out movement.

Figure 7:
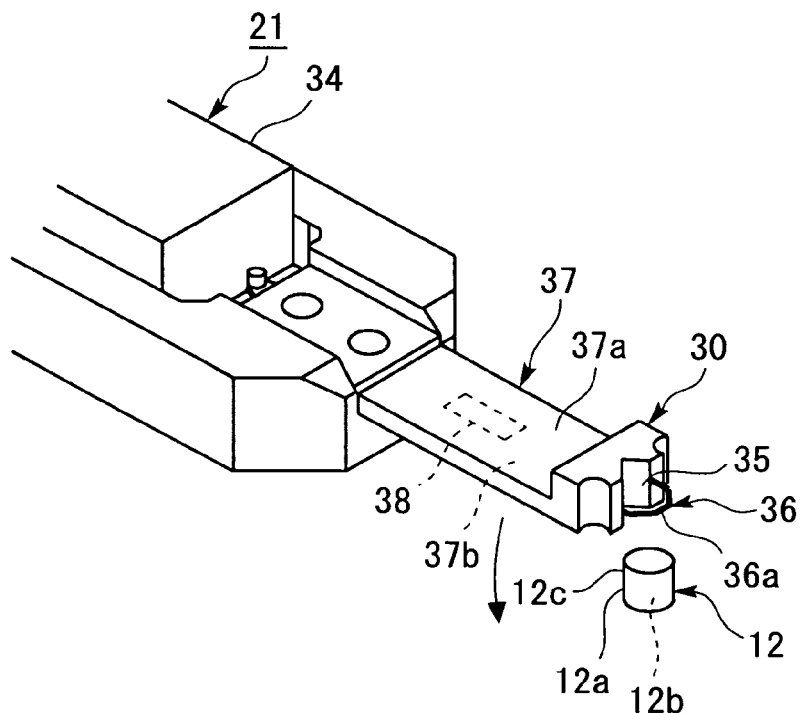
FIG. 7 is a perspective view of the lens grasping portion of the optical component lens assembling apparatus of the present invention.

As shown in FIG. 7, the lens grasping portion 30 has a V-shaped groove 35 for supporting a part of the outer peripheral side surface 12a of the lens 12, and the wire 36 serving as a pressing devices for pressing the outer peripheral surface 12a of the lens 12 against the V-shaped groove 35.

The lens grasping portion 30 is provided at the forward end of a plate-like lever 37. Strain gauges 38 are provided on both sides 37a and 37b of the lever 37.

As described below, the strain gauges 38 and 38 are capable of sensing the pressing force with which the lens 12 is pressed against the fiber block 13 when placing the lens 12 on the fiber block 13. This makes it possible to control the thickness of the adhesive applied to the lens 12.

Both ends of the wire 36 are fixed to the wire supporting member 34. A medium, arcuate portion 36a of the wire 36 protrudes to the exterior of the V-shaped groove 35.

As stated above, the wire supporting member 34 slides relative to the lever 37. As a result, the arcuate portion 36a of the wire 36 makes an in-and-out movement relative to the V-shaped groove 35.

As shown in FIG. 7, when grasping the lens 12 by the lens grasping devices 21, the wire 36 of the lens grasping portion 30 is arranged above the lens 12, with the lens 12 being set upright in the vertical direction.

Next, the lens grasping device 21 is lowered, and the wire 36 is arranged on the outer side of the outer peripheral side surface 12a of the lens 12. Next, the wire supporting member 34 is caused to slide to the side opposite to the lens grasping portion 30 by the direct-acting cylinder 33. As a result, the wire 36 as a whole, fixed to the wire supporting member 34, moves in the same direction as the wire supporting member 34.

Figure 8:
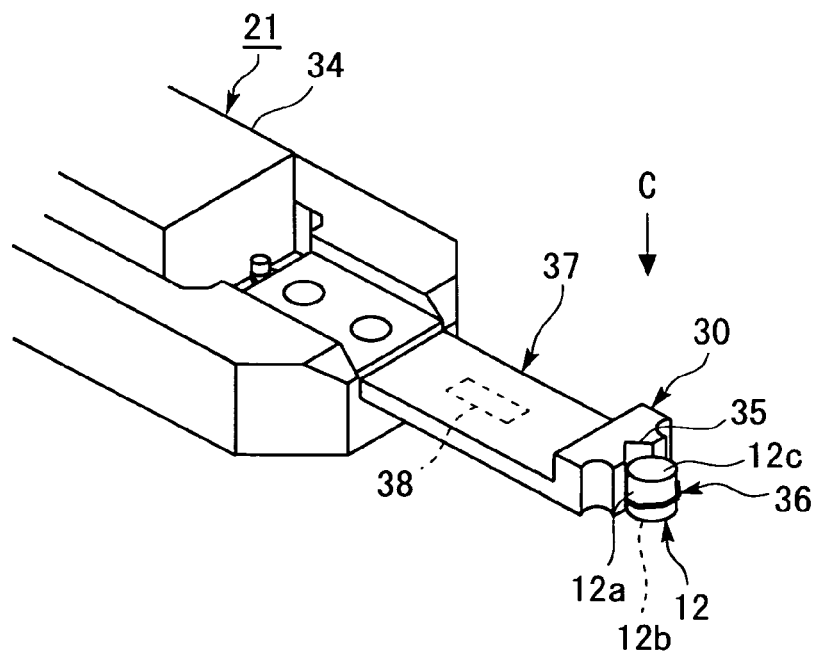
FIG. 8 is a perspective view showing how a lens is grasped by the lens grasping device of the optical component lens assembling apparatus of the present invention.
Figure 9:
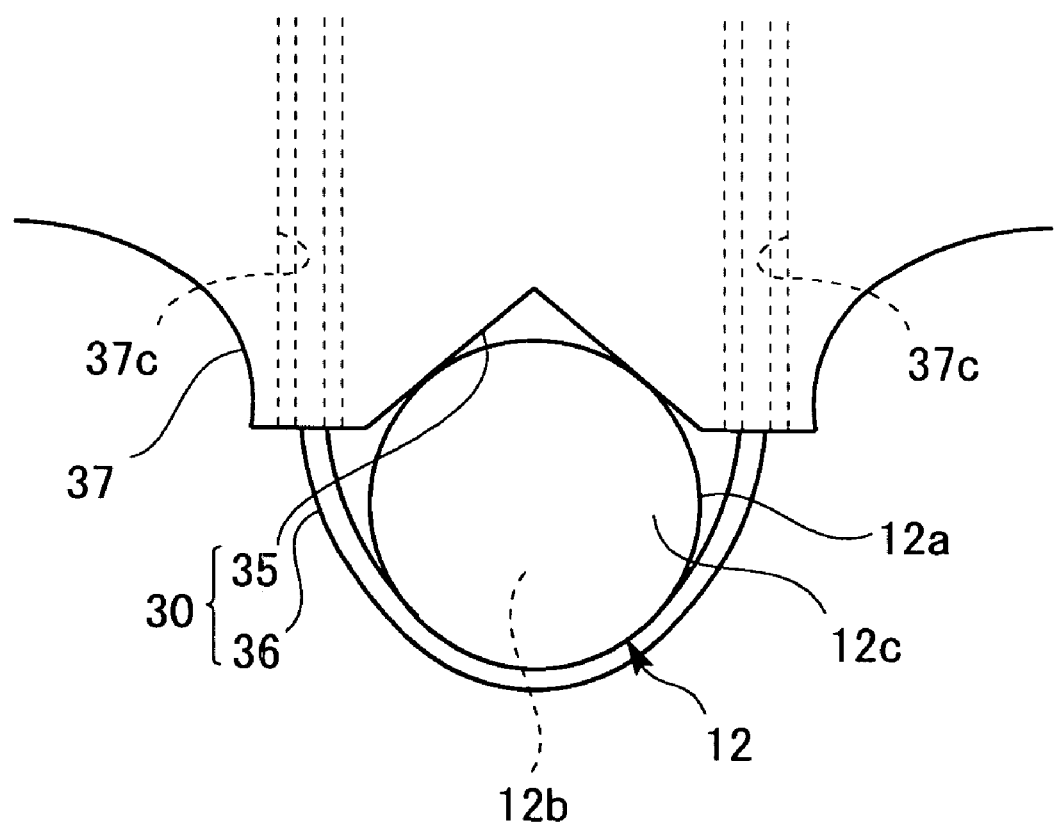
FIG. 9 is a view, taken in the direction of arrow C of FIG. 8, of the lens grasping device of the optical component lens assembling apparatus of the present invention.

Then, as shown in FIG. 8, the arcuate portion 36a of the wire 36 moves to the V-shaped groove 35 side. Then, the arcuate portion 36a of the wire 36 is wrapped around the outer peripheral side surface 12a of the lens 12. As shown in FIG. 9, when the wire 36 further moves, the outer peripheral side surface 12a of the lens 12 is pressed against the V-shaped groove 35 by the arcuate portion 36a. As a result, the lens 12 is reliably grasped by the lens grasping portion 30.

Furthermore, when the lens 12 is grasped, the portions of the lens grasping portion 30 does not come into contact the end surfaces 12b and 12c of the lens 12, which constitute the optical surfaces, so that it is possible to prevent flaws being generated in the end surfaces 12b and 12c of the lens 12.

In this embodiment, the portions coming into contact with the lens 12, that is, the inner surfaces of the V-shaped groove 35 of the lens grasping portion 30, and the wired 36, are coated with a relatively soft material. As a result, it is possible to further mitigate the damage of the lens 12. The wire 36 is inserted into guide holes 37c of the lever 37.

As described below, the lens grasping state detecting devices 31 detects the sliding amount of the wire supporting member 34, so it makes a judgment as to whether the lens 12 is being grasped by the lens grasping portion 30 or not.

Figure 10:
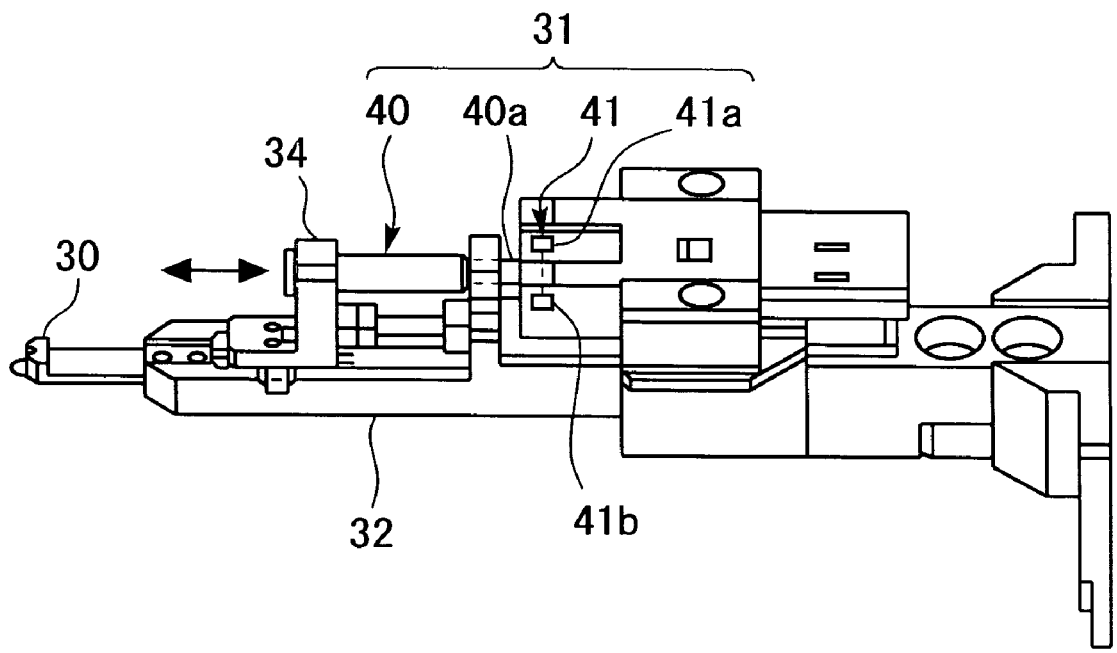
FIG. 10A is a perspective view of the lens grasping state detecting device of the optical component lens assembling apparatus of the present invention.
FIG. 10B is a diagram showing the photo sensor and the detection rod.
Figure 10:
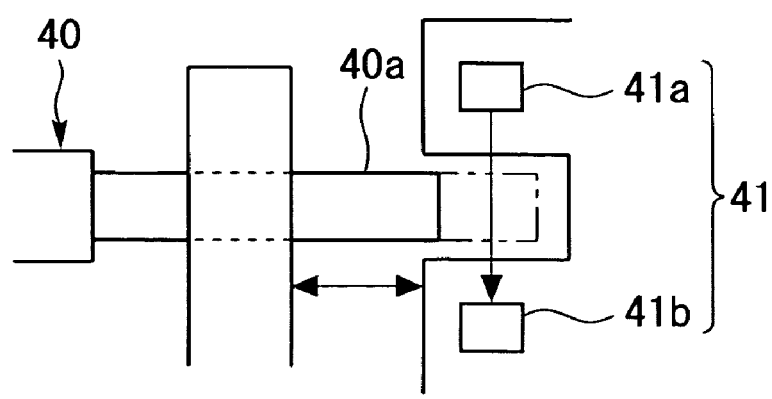

That is, as shown in FIG. 10A, the lens grasping state detecting devices 31 has a detection rod 40 fixed to the wire supporting member 34, and a photo sensor 41 for detecting a detection portion 40a of the detection rod 40.

As shown in FIG. 10B, the photo sensor 41 has a light emitting portion 41a and a light receiving portion 41b. The light emitting portion 41a and the light receiving portion 41b are arranged at an appropriate distance from each other. The detection portion 40a of the detection rod 40 is arranged so as to be capable of getting into and out of the gap between the light emitting portion 41a and the light receiving portion 41b of the photo sensor 41.

When the lens 12 is grasped by the lens grasping portion 30, the wire 36 is engaged with the outer peripheral side surface 12a of the lens 12. Thus, the sliding amount of the wire supporting member 34 in the direction opposite to the lens grasping portion 30 is small.

At this time, the detection portion 40a of the detection rod 40 is not inserted into the gap between the light emitting portion 41a and the light receiving portion 41b of the photo sensor 41. Thus, the light emitted from the light emitting portion 41a is detected by the light receiving portion 41b. In this case, it is judged that the lens 12 is being grasped by the lens grasping portion 30.

When no lens 12 is being grasped by the lens grasping portion 30, the sliding amount of the wire supporting member 34 in the direction opposite to the lens supporting portion 30 is large.

Then, the detection portion 40a of the detection rod 40 is inserted into the gap between the light emitting portion 41a and the light receiving portion 41b. Thus, the light emitted from the light emitting portion 41a is not detected by the light receiving portion 41b. In this case, it is judged that no lens 12 is being grasped by the grasping portion 30.

The lens moving devices 23 of FIG. 1 has an X-stage 45, a Y-stage 46, and a Z-stage 47. The lens grasping devices 21 and the lens grasping state detecting devices 31 are mounted to a slider 47a of the Z-stage 47.

The lens grasping devices 21 is operated by the lens moving devices 23, so movement of the lens 12 grasped by the lens grasping devices 21, optical axis adjustment, etc. are effected.

Figure 11:
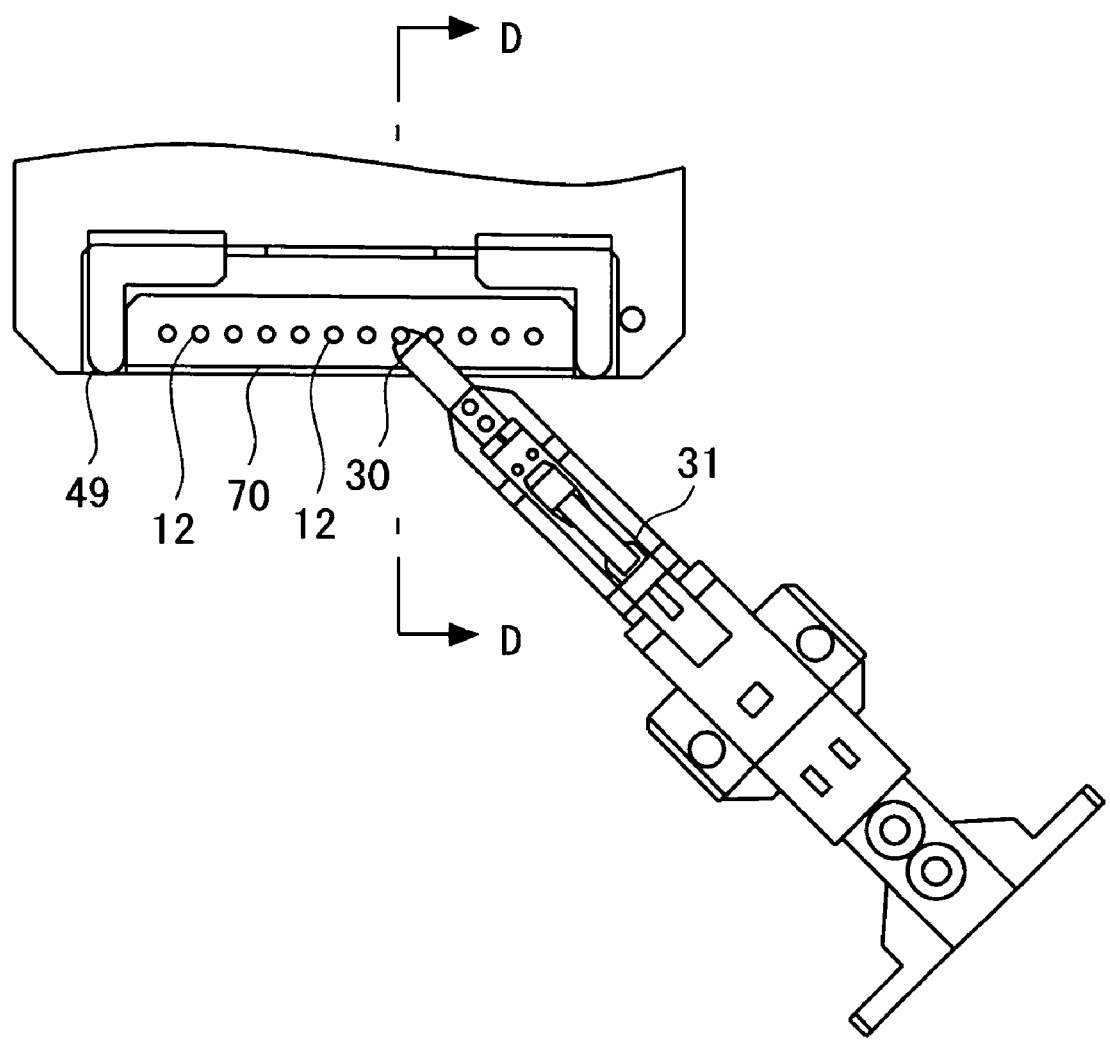
FIG. 11 is a diagram showing the lens supply stand and the lens tray of the optical component lens assembling apparatus of the present invention.

As shown in FIG. 11, the lens supply stand 49 of FIG. 1 is formed so as to allow placing of a lens tray 70 of a predetermined size. On the lens tray 70, a plurality of lenses 12 are arranged in a row at predetermined intervals.

Figure 12:
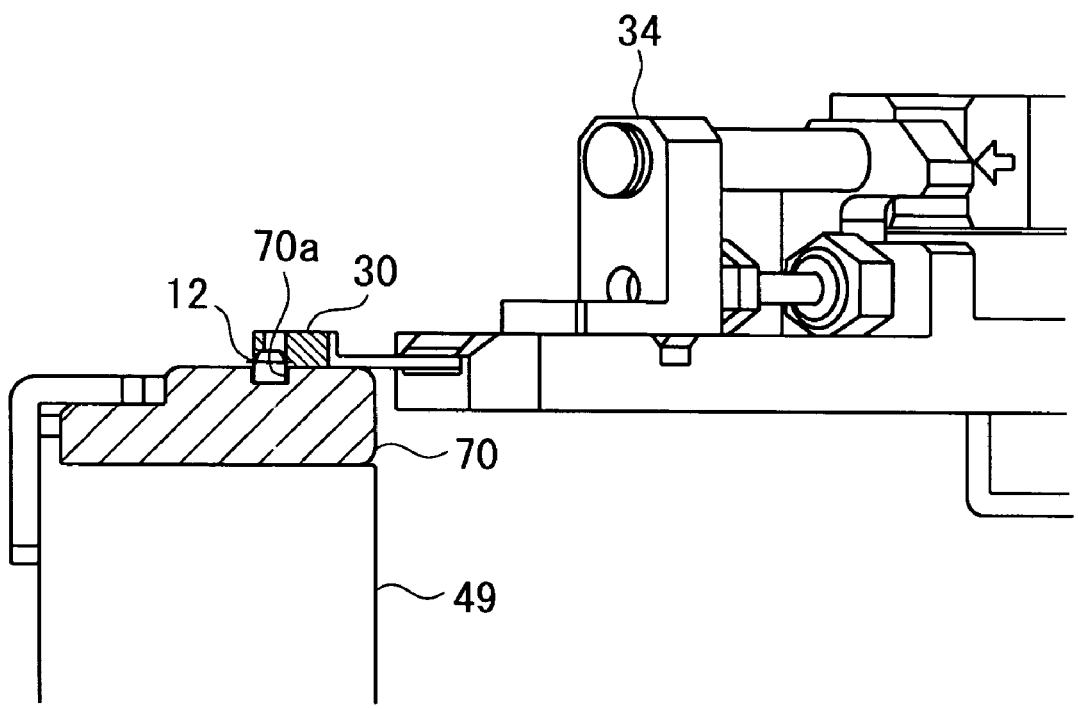
FIG. 12A is a sectional view, taken along the line D-D of FIG. 11, of the lens supply stand and the lens tray of the optical component lens assembling apparatus of the present invention.
FIG. 12B is a sectional view of a lens accommodated in the lens tray.
Figure 12:
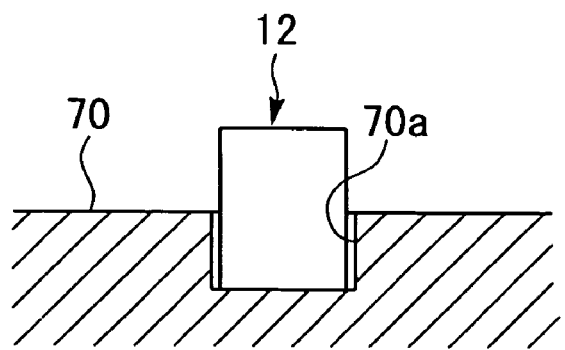

As shown in FIG. 12A, a plurality of recesses 70a are provided at predetermined intervals in the lens tray 70. The lenses 12 are conveyed while held in the recesses 70a. As shown in FIG. 12B, in the state in which the lenses 12 are held in the recesses 70a, a part of each lens 12 protrudes from the lens tray 70. This protruding portion of the lens 12 is grasped by the lens grasping portion 30 of the lens grasping devices 21.

In this embodiment, the lens tray 70 is placed on the lens supply stand 49 by manual operation. It is also possible for the lens tray 70 to be automatically placed on the lens supply stand 49.

Figure 13:
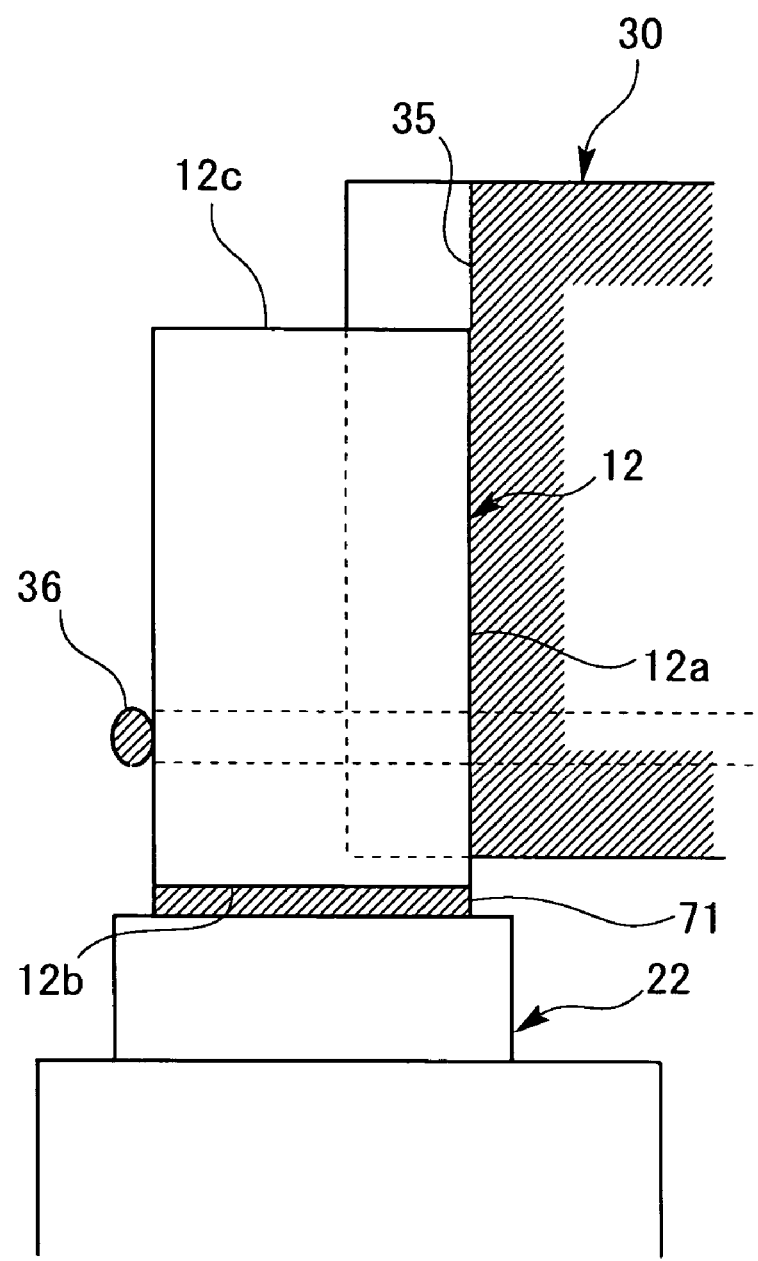
FIG. 13 is a diagram showing the adhesive applying device of the optical component lens assembling apparatus of the present invention.

As shown in FIG. 13, the adhesive applying devices 22 of FIG. 1 applies a UV setting adhesive 71 in a uniform thickness to the adhesive application surface 12b of the lens 12 being grasped by the lens grasping portion 30 of the lens grasping devices 21.

As the adhesive applying devices 22, an ordinary dispenser or the like may be used. Here, a detailed description of the adhesive applying devices 22 will be omitted.

The UV light irradiation head 50a of the first UV light irradiation unit 50 of FIG. 2 moves in synchronization with the lens grasping portion 30 of the lens grasping device 21. Then, the adhesive 71 applied to the lens 12 is constantly irradiated with the UV light emitted from the first UV light irradiation unit 50.

The UV light irradiation head 51a of the second UV light irradiation unit 51 of FIG. 2 is formed so as to be swingable. Due to this construction, the adhesive 71 applied to the lens 12 is irradiated with the UV light emitted from the UV light irradiation head 51a.

Figure 14:
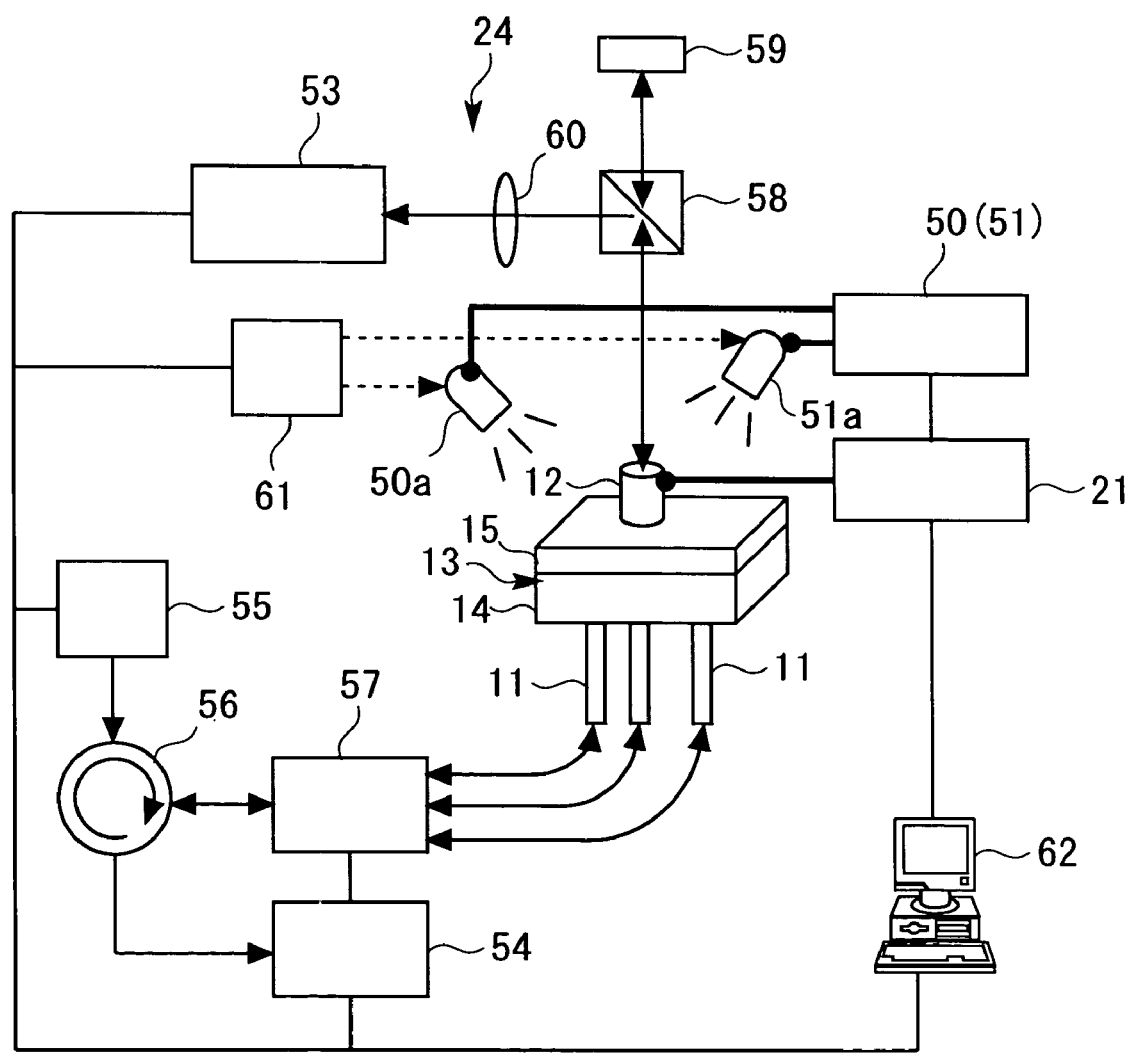
FIG. 14 is a schematic diagram showing the optical axis alignment state detecting device of the optical component lens assembling apparatus of the present invention.

As shown in FIG. 14, the optical axis alignment state detecting devices 24 of FIG. 1 has an optical axis position measuring device 53 for measuring the optical axis position of the light passed through the optical fiber 11 and the lens 12, and an optical power meter 54 for measuring the output of the light passed through the lens 12.

The optical axis position measuring device 53 detects the alignment state of the optical axes of the lens 12 and the optical fiber 11 in a relatively wide range. The optical power meter 54 detects the alignment state of the optical axes of the lens 12 and the optical fiber 11 with high precision.

In this embodiment, light emitted from the LD light source 55 is passed through an optical circulator 56 and an optical selector 57, and is input to the optical fibers 11 fixed to the fiber block 13. The light output from the optical fibers 11 is emitted to the exterior through the second block 15 of the fiber block 13 and the lens 12.

The light emitted to the exterior from the lens 12 is divided by a beam splitter 58. And a portion of the light divided by the beam splitter 58 is supplied to the optical axis position measuring device 53.

The remaining portion of the light divided by the beam splitter 58 is reflected by a reflection mirror 59. The light reflected by the reflection mirror 59 is input to the optical power meter 54 by way of the beam splitter 58, the lens 12, the second block 15 of the fiber block 13, the optical fibers 11, and the optical selector 57. In FIG. 14, numeral 61 indicates a UV light source, and numeral 62 indicates a control PC (personal computer).

The optical axis position measuring device 53 measures the optical axis position of the input light.

Here, optical axis alignment is performed on the lens 12 and the optical fiber 11 based on the intensity of the light and the optical axis position as measured by the optical axis position measuring device 53. This optical axis alignment operation is effected while moving the lens 12 by the lens moving devices 23.

The optical power meter 54 monitors the output light quantity of the lens 12. Then, based on the detection result obtained from the power meter 54, optical axis alignment is further effected on the lens 12 and the optical fiber 11. This optical axis alignment operation is also conducted while moving the lens 12 by the lens moving device 23.

Here, the alignment state of the optical axes of the lens 12 and the optical fiber 11 is detected by the optical axis position measuring device 53 and the optical power meter 54, and, based on their respective detection results, the optical axis alignment of the lens 12 and the optical fiber 11 is effected.

Thus, the optical axes of the lens 12 and the optical fiber 11 can be aligned with each other with accuracy.

Next, the case will be described in which the lens 12 of the optical component 10 is assembled by using the optical component lens assembling apparatus 1.

Prior to the assembly of the lens 12, optical route self positional calibration is effected by using reference products (a lens and an optical fiber). The assembly of the lens 12 is effected so as to be in conformity with the characteristics of the reference products used in the calibration, thereby suppressing variation in the product characteristics. Further, by performing calibration with a master lens, it is possible to cope with secular change in the apparatus.

Figure 15:
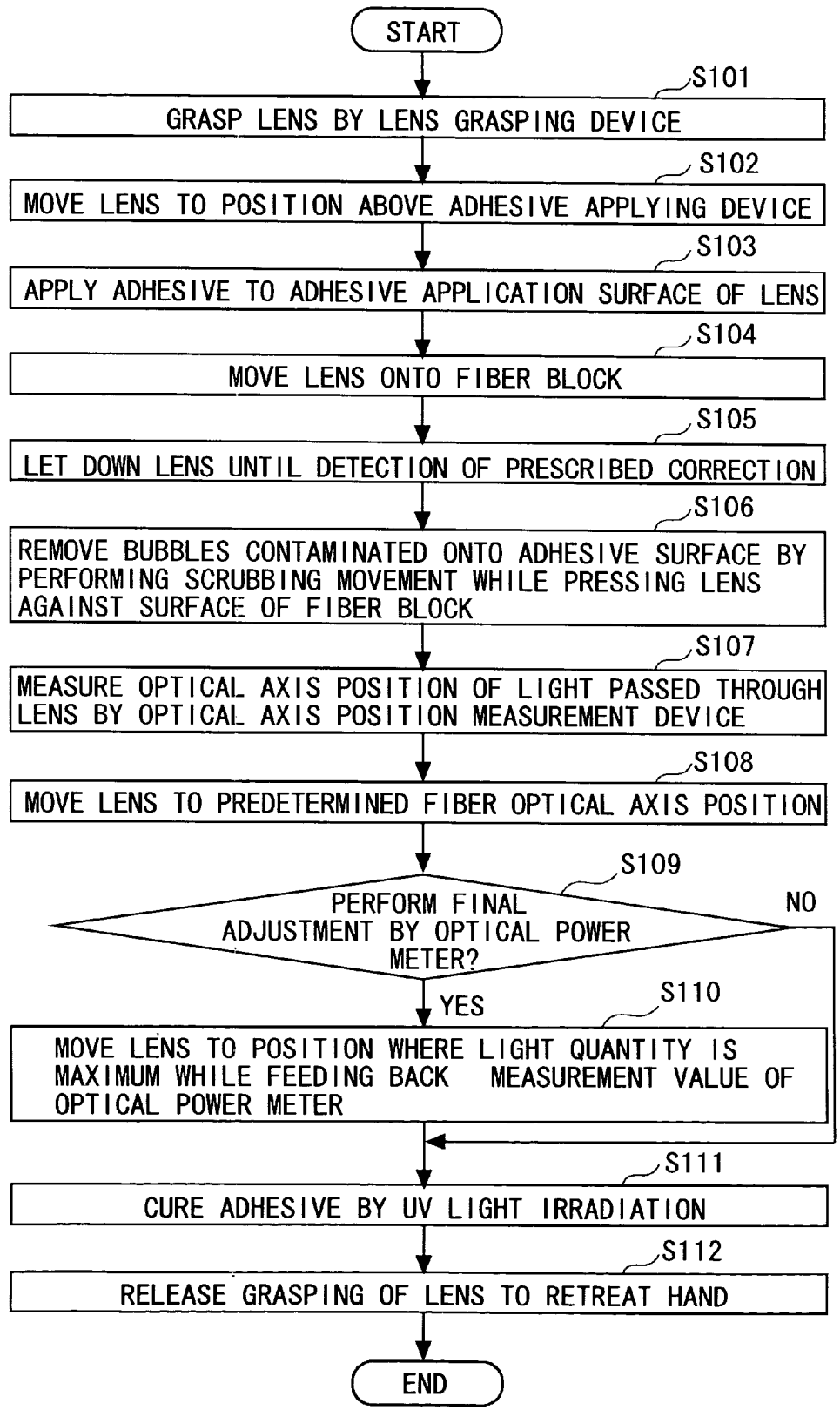
FIG. 15 is a flowchart showing the assembly procedures for the optical component lens assembling apparatus of the present invention.

FIG. 15 is a flowchart showing the lens assembly procedures using the optical component lens assembling apparatus 1. Here, one lens 12 in the lens tray 70 is grasped by the lens grasping portion 30 of the lens grasping devices 21 (see FIG. 8) (S101).

Next, the lens 12 grasped by the lens grasping devices 21 is moved to a position above the adhesive applying devices 22 (S102).

Next, the adhesive 71 (see FIG. 13) is applied to the adhesive application surface (lower end surface) 12b of the lens 12 by the adhesive applying devices 22 (S103).

Figure 16:
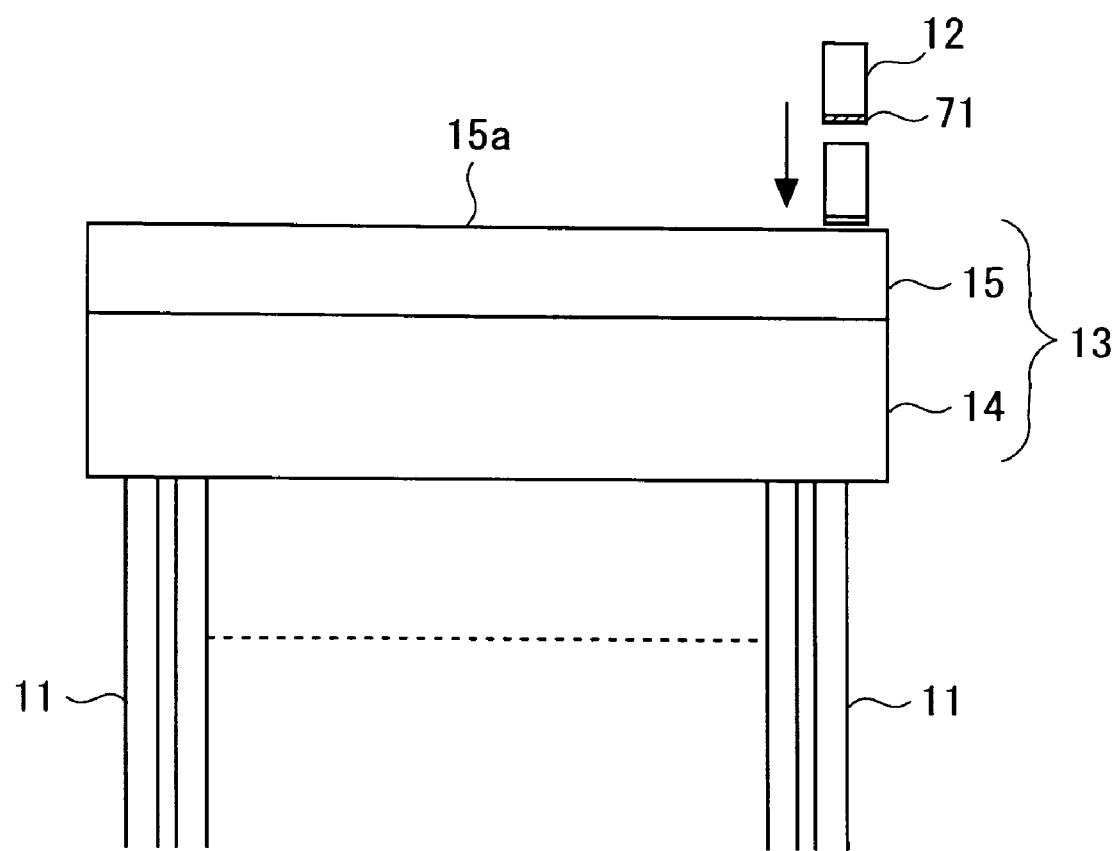
FIG. 16 is a diagram showing the assembly method for the optical component lens assembling apparatus of the present invention.

Next, as shown in FIG. 16, the lens 12 is arranged at a position above the lens bonding position of the surface 15a of the fiber block 13 by the lens moving devices 23 (S104).

Next, the lens 12 is lowered by the lens moving devices 23 (S105). At this time, distortion generated in the lever 37 is detected by the strain gauges 38 and 38 (see FIG. 7) attached to the lever 37 of the lens grasping devices 21. As a result, the load acting on the adhesive application surface 12b of the lens 12 is measured.

When the load acting on the adhesive application surface 12b of the lens 12 reaches a prescribed value, the lowering of the lens 12 is stopped, so the thickness of the adhesive 71 applied to the adhesive application surface 12b of the lens 12 is controlled.

Next, a scrubbing movement (rubbing movement) is made, with the lens 12 pressed against the surface 15a of the fiber block 13, so bubbles in the adhesive 71 are forced out (S106).

Next, the measurement of the optical axis position of the light passed through the lens 12 is performed by the optical axis position measurement device 53 (see FIG. 13) of the optical axis alignment state detecting devices 24 (S107). Then, the lens 12 is moved such that the optical axis position of the optical axis position measurement device 53 is matched with a predetermined optical fiber optical axis position (S108).

In this embodiment, a judgment is made next as to whether final adjustment is to be performed by the optical power meter 54 or not (S109).

Here, when it is judged that final adjustment is to be performed by the optical power meter 54, the lens 12 is next moved to a position where the light quantity is maximum while feeding back the measurement value of the optical power meter 54 (S110).

Next, UV light is applied to the adhesive 71 between the lens 12 and the surface 15a of the fiber block 13 by the first UV light irradiation unit 50 and the second UV light irradiation unit 51 (S111), so the lens 12 is fixed to the fiber block 13.

Next, the grasping of the lens 12 by the lens grasping portion 30 of the lens grasping devices 21 is released, and the lens grasping devices 12 is restored to the standby position (S112), so the assembly of one lens 12 is completed. From this onward, the requisite number of lenses 12 are assembled by the same procedures as described above.

When, in the above step (S109), it is judged that final adjustment is not to be performed by the optical power meter 54, the above steps (S111) and (S112) are executed.

In this way, with the optical component lens assembling apparatus 1 of the present invention, it is possible to automatically assemble the lenses 12 to the fiber block 13 provided with the optical fibers 11. The automatic assembly is possible even when the lenses 12 are minute.

Thus, as compared to the case in which the lenses 12 are assembled by manual operation as in the prior art, the operational efficiency in assembly can be substantially improved. Further, since the assembly operation is mechanized, it is possible to achieve a reduction in variation in assembly precision.

The lens grasping portion 30 of the lens grasping devices 21 grasps the outer peripheral side surface 12a of the cylindrical lens 12, which devices it can grasp the lens without coming into contact with the end surfaces 12b and 12c, which constitute the optical surfaces of the lens 12. Thus, it is possible to prevent the end surfaces 12b and 12c, which constitute the optical surfaces of the lens 12, from being damaged.

Further, in this embodiment, the inner surface of the V-shaped groove 35 of the lens grasping portion 30 and the wire 36 are coated with an appropriate material. Thus, it is possible to further mitigate the damage of the lens 12.

Further, the lever 37 retaining the lens grasping portion 30 of the lens grasping devices 21 is provided with the strain gauges 38 and 38. Then, by measuring the force with which the lens 12 is pressed against the fiber block 13, the thickness of the adhesive 71 applied to the lens 12 is controlled.

Thus, the bonding force for the lens 12 and the fiber block 13 can be maintained at a prescribed value, so that it is possible to reliably effect the bonding of the lens 12 and the fiber block 13.

Further, the optical axis alignment of the lens 12 and the optical fiber 11 is effected based on the measurement results obtained by the optical axis position measuring device 53 and the optical power meter 54. In this way, the optical axis alignment state is detected in two stages, and optical axis alignment is effected for the detection at each stage. Thus, the optical axis alignment of the lens 12 and the optical fiber 11 can be effected more accurately.

Further, the bonding of the lens 12 and the fiber block 13 is effected with the UV-setting adhesive 71, so the irradiation position, the irradiation light quantity, and the irradiation time for the UV light source are controlled, making it possible to prevent positional deviation of the lens 12 as a result of the rapid curing of the adhesive 71 and to optimize the curing time.

Further, to cure the light-hardening adhesive 71 for bonding the lens 12 and the fiber block 13 to each other, two UV light irradiation units, i.e., the first and second UV light irradiation units 50 and 51 are used, so that it is possible to uniformalize the UV irradiation light, thereby reducing unevenness in the curing of the adhesive 71.

While the above-described embodiment the present invention is applied to a case in which minute lenses and optical fibers are assembled together, the present invention is not restricted thereto, but is also applicable to an apparatus for and a method of manufacturing an optical component to be manufactured through combination of a first optical member and a second optical member.

OTHERS

The disclosures of Japanese patent application No. JP2006-025652 filed on Feb. 2, 2006 including the specification, drawings and abstract are incorporated herein by reference.

What is claimed is:

1. An apparatus for assembling a lens of an optical component having at least one optical fiber, a fiber block for fixing the optical fiber in position, and a cylindrical lens to be fixed to the fiber block with its optical axis aligned with that of the optical fiber, wherein the cylindrical lens is fixed, the apparatus comprising:
- a fiber block device to fix in position the fiber block on which the optical fiber is provided;
- a lens grasping device to grasp an outer peripheral side surface of the cylindrical lens supplied to a lens supply position;
- an adhesive applying device to apply an adhesive to one end surface of the cylindrical lens;
- a lens moving device to move the cylindrical lens grasped by the cylindrical lens grasping device to the adhesive applying device, and to place one end surface of the cylindrical lens, to which the adhesive has been applied, at a predetermined position of the fiber block;
- a light source to emit light to the optical fiber;
- a beam splitter to divide the light passed through the optical fiber and the cylindrical lens between a first direction and a second direction;
- a reflection mirror to cause a reflected light obtained through reflection of the light of the first direction, passing through the beam splitter, to enter the cylindrical lens again;
- an optical axis position measuring device to measure a optical axis and position of the light of the second direction; and
- an optical power meter to measure the output of the reflected light entering into the cylindrical lens again.

2. The apparatus for assembling the optical component according to claim 1, wherein the lens grasping device includes: a V-shaped groove to support a portion of the outer peripheral side surface of the cylindrical lens; and a pressing device to press the outer peripheral side surface of the cylindrical lens toward the V-shaped groove.

3. The apparatus for assembling the lens of the optical component according to claim 2, wherein the pressing device is a wire wrapped around a portion on the side opposite to the portion of the outer peripheral side surface of the cylindrical lens supported by the V-shaped groove and which is pulled to the V-shaped groove side.

4. The apparatus for assembling the optical component according to claim 1 wherein the adhesive is a photo-setting adhesive.

5. The apparatus for assembling the optical component according to claim 1, further comprising a lens grasping state detecting device to detect the state in which the cylindrical lens is grasped by the lens grasping device.

6. The apparatus for assembling the optical component according to claim 1, wherein the optical component comprises a plurality of optical fibers and the cylindrical lenses arranged in parallel.

* * * * *